(12) United States Patent
Aisu

(10) Patent No.: US 8,588,577 B2
(45) Date of Patent: Nov. 19, 2013

(54) TIMER-RECORDING MANAGING APPARATUS, TIMER-RECORDING MANAGING METHOD AND RECORDER

(75) Inventor: Hideyuki Aisu, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1081 days.

(21) Appl. No.: 12/052,518

(22) Filed: Mar. 20, 2008

(65) Prior Publication Data

US 2008/0232767 A1    Sep. 25, 2008

(30) Foreign Application Priority Data

Mar. 23, 2007    (JP) ............................... P2007-076203

(51) Int. Cl.
*H04N 5/76*    (2006.01)

(52) U.S. Cl.
USPC .......................................................... 386/238

(58) Field of Classification Search
USPC ............................................ 386/83, 92, 238
See application file for complete search history.

(56) References Cited

U.S. PATENT DOCUMENTS

| | | | | |
|---|---|---|---|---|
| 6,177,931 B1 * | 1/2001 | Alexander et al. | ............... | 725/52 |
| 6,208,799 B1 * | 3/2001 | Marsh et al. | ................... | 386/292 |
| 6,344,878 B1 * | 2/2002 | Emura | ........................... | 348/460 |
| 6,650,824 B1 | 11/2003 | Horlander et al. | | |
| 6,735,600 B1 | 5/2004 | Andreev et al. | | |
| 6,760,538 B1 * | 7/2004 | Bumgardner et al. | ........ | 386/291 |
| 6,981,044 B1 | 12/2005 | Coez et al. | | |
| 2001/0012439 A1 * | 8/2001 | Young et al. | .................... | 386/83 |
| 2001/0033343 A1 * | 10/2001 | Yap et al. | ...................... | 348/734 |
| 2004/0083468 A1 | 4/2004 | Ogawa et al. | | |
| 2004/0156614 A1 | 8/2004 | Bumgardner et al. | | |

(Continued)

FOREIGN PATENT DOCUMENTS

| | | |
|---|---|---|
| EP | 1626577 A1 | 2/2006 |
| EP | 1763174 A1 * | 3/2007 |
| JP | 2006-324776 | 11/2006 |

(Continued)

OTHER PUBLICATIONS

Briggs, et al., Coloring Register Pairs, ACM Letters on Programming Languages and Systems (LOPLAS) archive, vol. 1, Issue 1, p. 3-13, 1992.

(Continued)

*Primary Examiner* — Taghi Arani
*Assistant Examiner* — Dao Ho
(74) *Attorney, Agent, or Firm* — Turocy & Watson, LLP

(57) ABSTRACT

A timer-recording managing apparatus for a recorder that includes a plurality of recording resources that enable the recorder to simultaneously record broadcast programs. The apparatus includes a registration unit configured to register schedule information of the broadcast programs; a registration change unit configured to make a change on the schedule information; a schedule group extraction unit configured to extract a schedule group including a plurality of timer-recording schedules that are affected by an allocation of the recording resources to a start-vertex timer-recording schedule, when the registration change unit makes a change on the schedule information with respect to the start-vertex timer-recording schedule; and a resource allocation unit configured to collectively re-allocate the recording resources to the plurality of timer-recording schedules.

7 Claims, 16 Drawing Sheets

(56) References Cited

U.S. PATENT DOCUMENTS

| | | |
|---|---|---|
| 2004/0163053 A1 | 8/2004 | Snider |
| 2005/0005300 A1 | 1/2005 | Putterman et al. |
| 2005/0071872 A1 | 3/2005 | Case |
| 2006/0048123 A1 | 3/2006 | Martin |
| 2006/0150188 A1 | 7/2006 | Roman et al. |
| 2006/0277529 A1 | 12/2006 | Michimoto et al. |

FOREIGN PATENT DOCUMENTS

| | | |
|---|---|---|
| JP | 2007-013679 | 1/2007 |
| JP | 2007-013713 | 1/2007 |
| WO | 2005000214 A1 | 1/2005 |
| WO | 2005107367 A2 | 11/2005 |

OTHER PUBLICATIONS

Japanese Office Action dated Jan. 15, 2009 corresponding to U.S. Appl. No. 12/052,518, filed Mar. 20, 2008.

Extended European Search Report for Application No. 08005297.00-2202/1973347 issued on Jul. 14, 2011.

European Office Action for European Application No. 08 005 297.0 mailed on Sep. 10, 2013.

* cited by examiner

FIG. 2

EXAMPLE DATA FORMAT OF SCHEDULE REGISTRATION DATA

| ITEMS | EXAMPLES |
|---|---|
| CHANNEL | 1 |
| PROGRAM TITLE | SMILE HI! |
| STARTING DATE AND TIME | 2007/03/03/20:00 |
| END DATE AND TIME | 2007/03/03/21:00 |
| DEGREE OF PRIORITY (1-5) | 3 |
| CURRENT RECORDING RESOURCE ID (DESIGNATION) | R1 |
| DESIRED RECORDING RESOURCE ID (DESIGNATION) | R2 |
| ENABLE/DISABLE RE-ALLOCATION (Y/N) | Y |
| RESOURCE PATTERN ID (DESIGNATION) | P1 |
| ... | ... |

FIG. 4

EXAMPLE DEFINITION OF RECORDING RESOURCE

| RESOURCE ID | FIRST FUNCTIONAL COMPONENT | SECOND FUNCTIONAL COMPONENT | THIRD FUNCTIONAL COMPONENT |
|---|---|---|---|
| R1 | DIGITAL TUNER A | FORMATTER A | |
| R2 | DIGITAL TUNER B | FORMATTER B | |
| R3 | DIGITAL TUNER A | FORMATTER C | H.264 TRANSCODER |
| R4 | DIGITAL TUNER B | FORMATTER C | H.264 TRANSCODER |
| R5 | ANALOGUE TUNER | FORMATTER C | MPEG2 ENCODER |

FIG. 5

EXAMPLE DEFINITION TABLE OF
EXCLUSIVE RELATIONSHIP AMONG
RECORDING RESOURCES

|    | R1 | R2 | R3 | R4 | R5 |
|----|----|----|----|----|----|
| R1 | ×  | ○  | ×  | ○  | ○  |
| R2 | ○  | ×  | ○  | ×  | ○  |
| R3 | ×  | ○  | ×  | ×  | ×  |
| R4 | ○  | ×  | ×  | ×  | ×  |
| R5 | ○  | ○  | ×  | ×  | ×  |

FIG. 6

EXAMPLE DEFINITION OF RESOURCES

| RESOURCE PATTERN ID | RECORDING MODE | AGGREGATION OF AVAILABLE RESOURCES |
|---|---|---|
| P1 | DIGITAL BROADCAST | R1, R2 |
| P2 | DIGITAL BROADCAST-H.264 SPECIFIED | R3, R4 |
| P3 | ANALOGUE BROADCAST | R5 |

FIG. 15

RESOURCE PATTERN OF SCHEDULES
WITH WHICH SCHEDULE OF
INTEREST OVERLAP

|  | | P1 | P2 | P3 |
|---|---|---|---|---|
| RESOURCE PATTERN OF SCHEDULE WHICH IS AN OBJECT OF ORDER COMPUTATION | P1 | 1 | 1 | 0 |
| | P2 | 1 | 2 | 2 |
| | P3 | 0 | 1 | 1 |

TIMER-RECORDING MANAGING APPARATUS, TIMER-RECORDING MANAGING METHOD AND RECORDER

The entire disclosure of Japanese Patent Application No. 2007-76203 filed on Mar. 23, 2007, including specification, claims, drawings and abstract is incorporated herein by reference in its entirety.

BACKGROUND OF THE INVENTION

1. Field of the Invention

The present invention relates to a recorder capable of simultaneously recording a plurality of broadcast programs by timer-recording, and an apparatus and a method for managing schedules of the timer-recording.

2. Description of the Related Art

More and more equipments, which record broadcast programs, such as a DVD (Digital Versatile Disk) recorder or an HD (Hard Disk) recorder, come to implement a plurality of recording resources (a tuner, an encoder, a transcoder, and the like) to simultaneously record a plurality of broadcast programs whose time slots overlap each other. (See, JP-A-2007-13713 and JP-A-2006-324776.) After proliferation of home networks, it is expected that recording devices prevail, which enable sophisticated cooperative processing, such as shared recording of different programs preventing duplicated recording by exchanging schedule information among a plurality of recording devices or recording operation performed in functional cooperation with a plurality of external tuners or external HDDs (Hard Disk Drives).

In the case of a current DVD/HD recorder capable of simultaneously recording a plurality of programs, users must select and allocate a recording resource to be used for his/her timer-recording schedule, which poses heavy burden on the user. Further, allocation of resources is fixed in a scheduled sequence, and re-allocation of a resource is not performed in connection with a schedule whose allocation has once been determined. Therefore, a rate of successful allocation is deteriorated. Moreover, even when a change has arisen in circumstances for reasons of cancellation of the schedule made by the user or a change in the time slot of the program, re-allocation of the resource cannot be performed in connection with the registered schedule. Some DVD/HD recorders are equipped with the function of automatically scheduling recording of a program matching a keyword designated by the user. However, even in relation to automatic scheduling, available recording resources are allocated in a predetermined sequence, such as the order of a starting time of a program, as in the case of user's scheduling operation. Again, the rate of successful allocation is poor.

With regard to models whose recording resources exhibit an equivalent property, there are products which provide an automatic allocation function. However, a schedule which becomes an object of re-allocation is limited to only a schedule which conflicts directly with a new schedule. With regard to models whose recording resources are not equivalent (e.g., an analogue resource, a digital resource, and the like), products which provide an automatic allocation function are nowhere to find as of now.

In relation to sharing of recording operations among a plurality of devices in the home network, the user directly selects, from available resources, which recording device allocated to which schedule, and an automatic allocation function has not yet been realized.

SUMMARY

The invention aims at enabling collective re-allocation of recording resources to a plurality of relevant schedules in accordance with registration or cancellation of a new schedule or a change in time when a plurality of recording schedules are processed by simultaneous use of a plurality of recording resources, such as sharing of recording operations in recording equipment having a plurality of recording resources or among a plurality of recording devices in the home network.

The invention provides a timer-recording managing apparatus for managing schedules of timer-recording for a recorder that includes a plurality of recording resources for enabling the recorder to simultaneously record two or more broadcast programs. The apparatus may include: a registration unit configured to register schedule information including starting times and end times of the broadcast programs to be timer-recorded in accordance with respective timer-recording schedules; a registration change unit configured to make a change on the schedule information; a schedule group extraction unit configured to extract a schedule group including a plurality of timer-recording schedules that are affected by an allocation of the recording resources to a start-vertex timer-recording schedule, when the registration change unit makes a change on the schedule information with respect to the start-vertex timer-recording schedule; and a resource allocation unit configured to collectively re-allocate the recording resources to the plurality of timer-recording schedules.

BRIEF DESCRIPTION OF THE DRAWINGS

Embodiment may be described in detail with reference to the accompanying drawings, in which:

FIG. 2 is a table showing an example data format of schedule registration data of the recorder according to the embodiment;

FIG. 4 is a table showing an example definition of recording resources of the recorder;

FIG. 5 is a table showing an example definition of an exclusive relationship among the recording resources of the recorder;

FIG. 6 is a table showing an example definition of resource patterns of the recorder;

FIG. 15 is a table showing an example definition table of weights of orders among resource patterns of the recorder.

DETAILED DESCRIPTION

Figure 1:
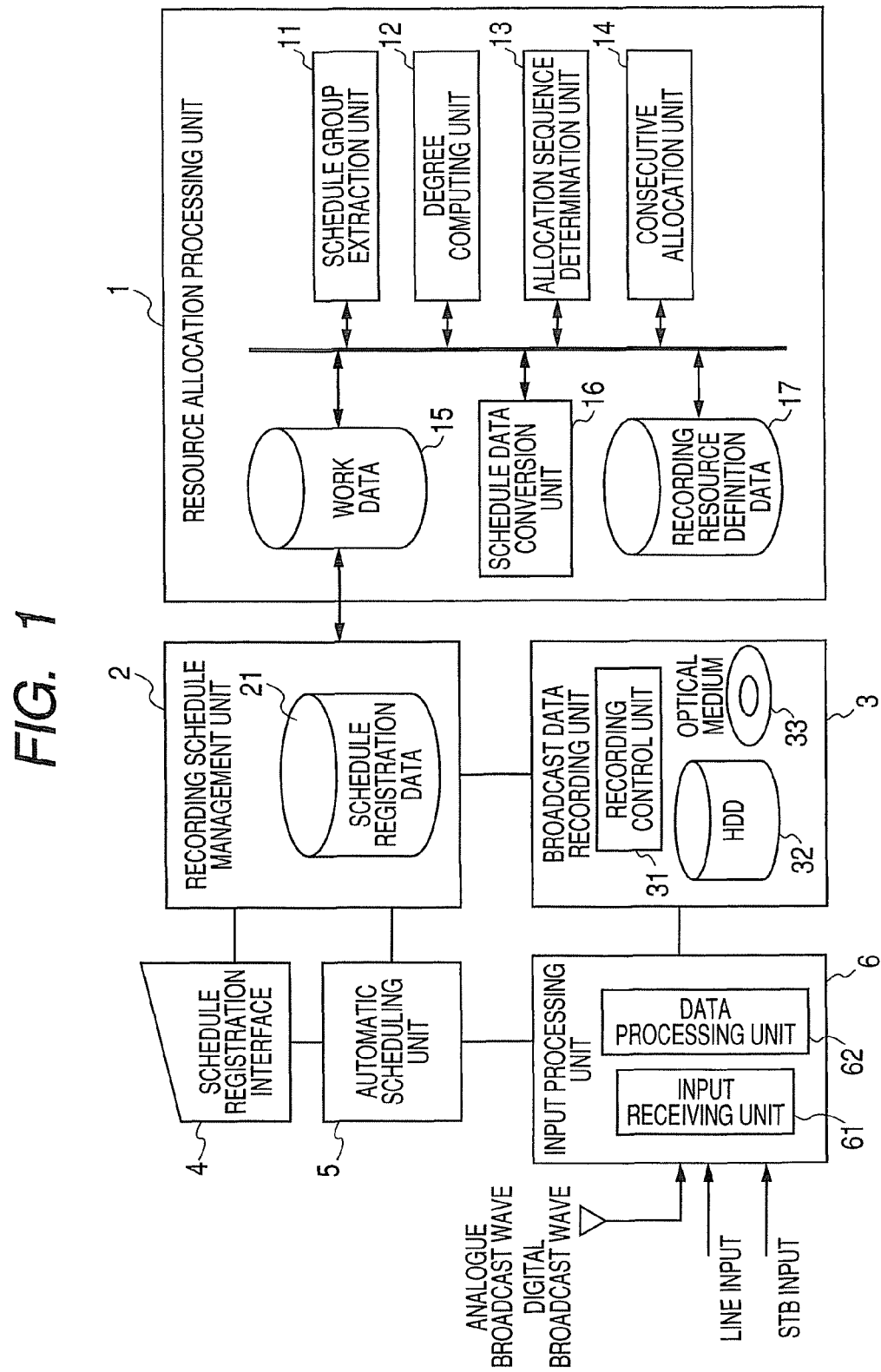
FIG. 1 is a block diagram showing the configuration of a recorder according to an embodiment.

FIG. 1 is a functional block diagram showing the configuration of a recorder which is an embodiment of the present invention. Respective functions may also be implemented by means of causing a computer to execute programs, or the functions may also be implemented by means of hardware.

In FIG. 1, a resource allocation processing unit 1 is a characteristic section of the present embodiment when compared with a related-art technique. The resource allocation processing unit 1 is formed from schedule group extraction unit 11, a degree calculating unit 12, an allocation sequence determination unit 13, a consecutive allocation unit 14, a schedule data conversion unit 16, and a storage medium which stores work data 15 and recording resource definition data.

The schedule group extraction unit 11 extracts, from schedule data, a schedule group which affects allocation of a resource to an added, deleted, or changed schedule. The degree calculating unit 12 calculates a degree of a schedule from resource exclusion definition data (information showing an exclusion relationship among resources used for recording) which are portions of the recording resource definition data 17 and from a resource exclusion relationship with an aggregation of resources of other schedules whose time slots are overlapping mutually. The allocation sequence determination unit 13 determines an appropriate sequence along which resources are allocated to schedules, in accordance with degrees and priority of the schedules. The "degrees" will be explained later. The consecutive allocation unit 14 consecutively performs allocation so as to satisfy an exclusion relationship with the resources which have already been allocated to other conflicting schedules, in accordance with the determined allocation sequence.

A recording schedule management unit 2, a broadcast data recording unit 3, a schedule registration interface 4, an automatic scheduling unit 5, and an input processing unit 6 are exemplified functional configurations of the recording scheduling apparatus of the present embodiment.

The schedule registration interface 4 is an interface by way of which the user registers a desired recording schedule by means of selecting a program from an electronic channel guide or directly inputting a recording time. Inputting operation performed by a combination of a remote controller and a TV screen or inputting operation performed by way of a PC (Personal Computer) are also included in the interface.

The automatic scheduling unit 5 automatically extracts, from the channel guide, a program whose commentary in the electronic channel guide includes a previously-designated keyword, or a program determined to be probably preferred by the user by means of a preference learning function.

The recording schedule management unit 2 has a storage medium which manages registered schedule information and which manages schedule data 21.

The input processing unit 6 corresponds to a function of selectively recording broadcast data and converting the thus-received data into recordable data. The input processing unit 6 includes an input receiving unit 61 including a section for receiving a digital input signal from a tuner or an STB (Set Top Box) which receives a broadcast wave, and a data processing unit 62 for converting the signal into a recordable format. A portion of the input processing unit 6 corresponds to a recording source which is automatically allocated by the resource allocation processing unit 1.

The broadcast data recording unit 3 includes a hard disk drive (HDD) 32 or a DVD drive 33 for recording broadcast data and recording control unit 31 for performing controlling operation. The recording medium may also be a video tape, mass-storage flash memory, and the like. There may also be the case where a portion of the broadcast data recording unit 3 will correspond to a recording resource which is automatically allocated by the resource allocation processing unit 1.

The schedule registration data 21 conceived in the present embodiment will now be described by means of an example shown in FIG. 2. The schedule registration data include at least information which enables specification of a starting/end time, information for specifying whether or not re-allocation of a resource is possible, and resource pattern information for specifying an aggregation of available recording resources. As in the case of the example shown in FIG. 2, the schedule registration data may also include information, such as a channel, a program title, the degree of priority for recording, a currently-allocated recording resource, a desired recording resource, and the like.

Figure 3:
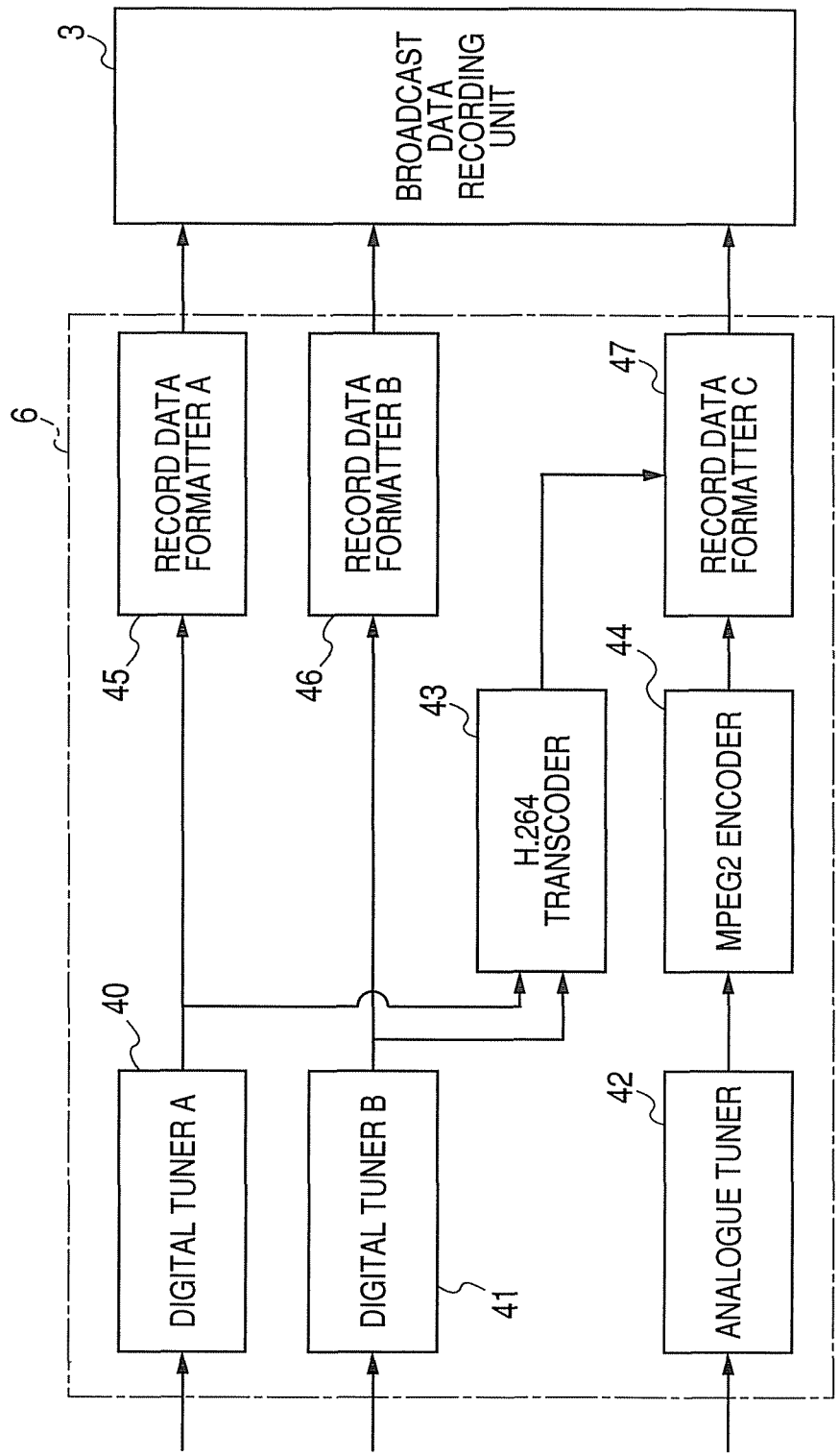
FIG. 3 is a block diagram showing an example configuration of an input processing unit shown in FIG. 1.

The recording resource and the resource pattern will be supplementally described by reference to FIGS. 3 through 6. FIG. 3 shows an exemplified configuration of the input processing unit shown in FIG. 1. The input processing unit 6 includes a tuner A 40 and a tuner B 41 for receiving a digital broadcast; a tuner 42 for receiving an analogue broadcast wave; an H.264 transcoder 43 for re-compressing a digital signal in the form of an H.264 format; an MPEG2 encoder 44 for compressing an analogue signal in the form of an MPEG2 format, to thus digitalize the signal; a recording data formatter A 45 and a data formatter B 46 for buffering a digital broadcast signal, to thus convert the signal into a format which enables writing of data into the recording medium; and a recording data formatter C 47 which buffers a compressed signal, to thus convert the signal into a form at which enables writing of data into the recording medium.

FIG. 4 shows an example in which a management ID is imparted to a recording resource. In the descriptions of the present embodiment, the term "recording resource" does not designate an individual tuner, or the like. Several functional components which must be simultaneously used during recording operation are handled in combination as the recording resource. For example, a resource R1 represents a combination of the digital tuner A and the formatter A, and a resource R3 represents a combination of the digital tuner A, the formatter C, and the H.264 transcoder. FIG. 5 shows an exclusion relationship (i.e., resources which cannot be used simultaneously) among combinations of recording resources achieved when the recording resource shown in FIG. 4 is defined. "Possible" denotes a resource which can be used simultaneously, and "Impossible" denotes a resource which cannot be used simultaneously. For instance, when the resource R1 is used, the resources R2, R4, and R5 are not exclusive, because they do not have mutually-conflicting functional components. However, the resource R3 cannot be used simultaneously. Further, when the resource R5 is in use, the formatter C is occupied, and hence the recording resources R3 and R4 cannot be used, either.

FIG. 6 is an exemplified definition of a resource pattern for specifying an aggregation of available recording resources. The resource pattern is previously defined in several types in accordance with an attribute of a program which is an object of timer-recording, a recording mode which can be specified by the user, and the like. In the present embodiment, three types of resource patterns are defined according to whether each program is a digital broadcast or an analogue broadcast and whether a recording mode is an ordinary mode or a mode specified by H.264.

The examples shown in FIGS. 3 through 6 are for description purposes. Even subsequent descriptions are provided on the basis of these examples, but the invention has versatility which enables the invention to address any configuration of a functional component.

Figure 7:
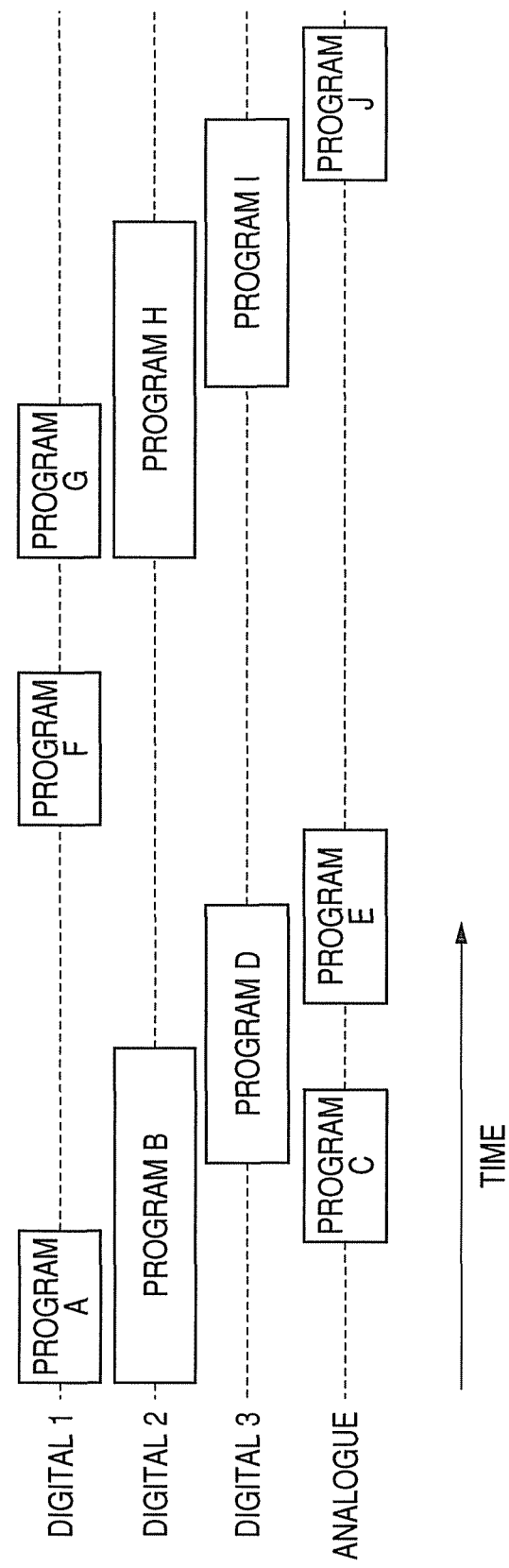
FIG. 7 is a time-series chart showing example registration of schedules in the recorder.
Figure 8:
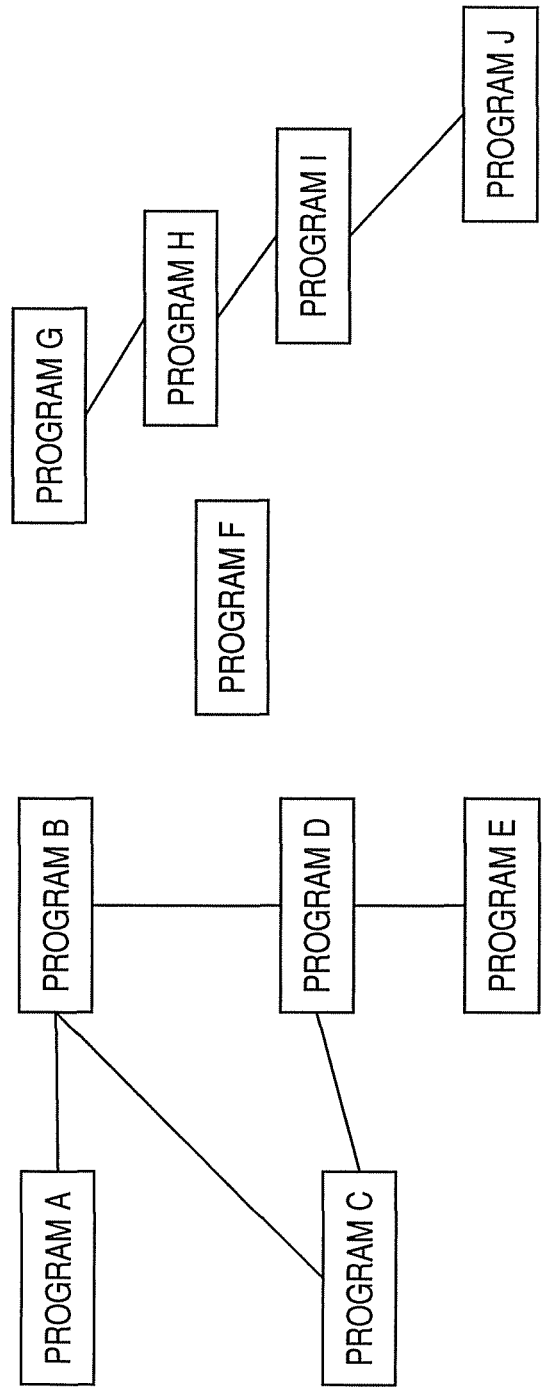
FIG. 8 is a view showing an example schedule conflict network of the recorder.

Next will be described modeling of a conflict relationship between schedules performed by means of a schedule conflict network which serves as the basis of the present embodiment, by reference to FIGS. 7 and 8. FIG. 7 is an example where scheduled recording times of a plurality of programs are arranged along a time axis. FIG. 8 is an example where the schedules shown in FIG. 7 are expressed as the schedule conflict network. In FIG. 8, respective vertexes in the network denote scheduled programs. When two vertexes are joined by means of a side (a connection arc), a partial overlap exists between the schedules in terms of a recording time slot. For instance, since a partial overlap exists between a program A and a program B in terms of a recording time slot, the vertexes are joined together by means of a side. However, a program F does not directly overlap any schedules in terms of a recording time slot. Therefore, a vertex of the program F is not joined by an edge.

Figure 9:
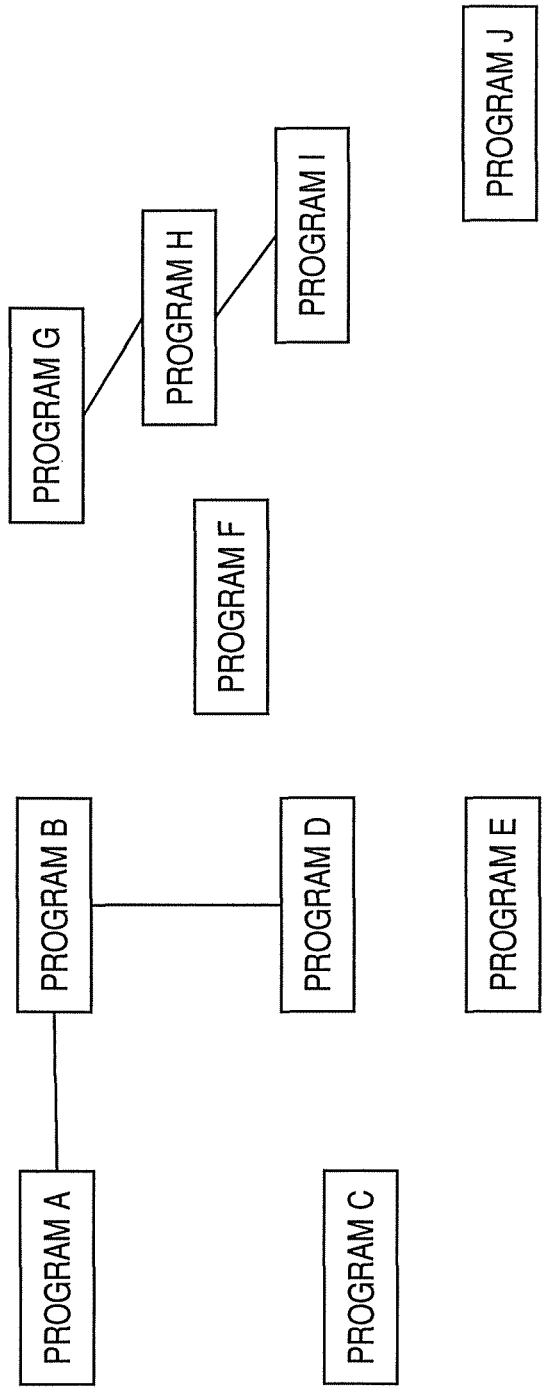
FIG. 9 is a view showing an example schedule conflict network achieved when a consideration is given to the exclusive relationship of the recording resources of the recorder.

It may also be the case where only schedules whose recording times partially overlap each other and whose available recording resources are mutually exclusive are joined together as another schedule conflict network. FIG. 9 shows that example. Here, on the assumption that the exclusive relationship shown in FIG. 5 is complied, the resource R5 for recording an analogue broadcast does not have an exclusive relationship with the digital broadcast recording resources R1 and R2, and hence schedules of programs C, E, and J are not joined to schedules of the digital broadcast. If the digital broadcast programs include a recording schedule designated by H.264 by the user, the schedule uses the recording resources R3 and R4 and hence is exclusive. The schedule is joined to the schedule conflict network.

Figure 10:
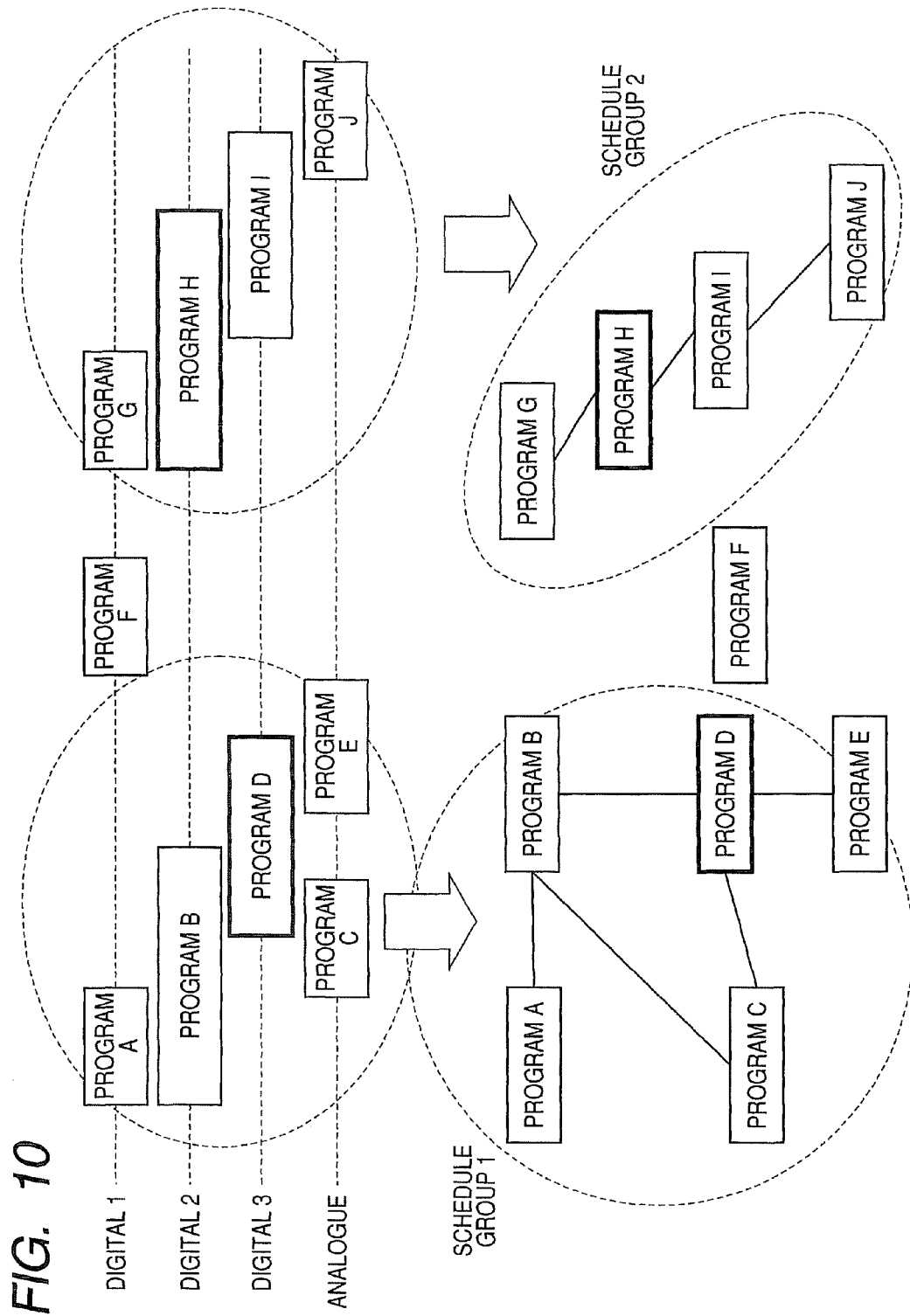
FIG. 10 is a view describing functions of a schedule group extraction unit of the recorder according to the embodiment.

Next, the function of the schedule group extraction unit 11 will be described by reference to FIG. 10. By means of taking, as a start-vertex schedule, a newly-added or deleted timer-recording schedule or a timer-recording schedule whose time has been changed as a result of a change in broadcast time or extension of a program, the schedule group extraction unit 11 extracts a plurality of schedule groups connected to a start-vertex schedule as schedule groups which mutually affect allocation of recording resources to the start-vertex schedule in the schedule conflict network, to thus take the schedule groups as objects of reallocation. The expression "a certain schedule is connected to a start-vertex schedule" unit that a path extending from a node corresponding to a start-vertex schedule to a schedule of interest is present in the network, and the schedule does not necessarily overlap the start-vertex schedule in terms of a time. As shown in FIG. 10, when the program D (indicated by a solid frame) is taken as a start-vertex schedule in connection with the example shown in FIG. 7, the programs A, B, C, D, and E are extracted as a schedule group 1. When the program H is taken as a start-vertex schedule, the programs G, H, I, and J are extracted as a schedule group 2.

Figure 11:
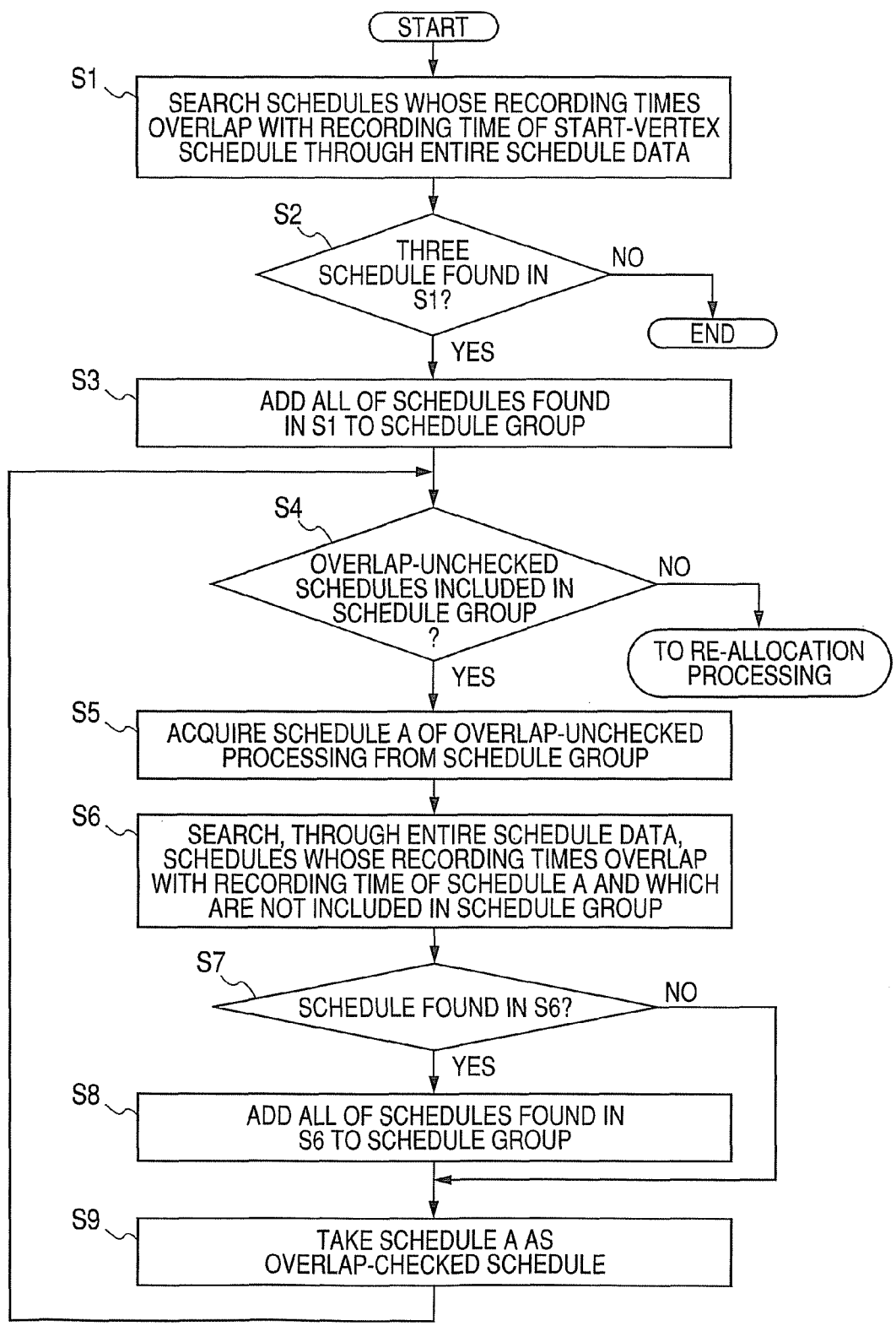
FIG. 11 is a flowchart showing the overview of processing procedures of the schedule group extraction unit of the recorder.

FIG. 11 shows overview of processing of the schedule group extraction unit 11. First, schedules whose recording times overlap with the recording time of the start-vertex schedule are retrieved from the entire schedule data (step S1). When no overlapping schedules are found, processing ends (NO in step S2). When overlapping schedules are found (YES in step S2), all of the schedules found in step S1 are added to a schedule group (step S3). When the start-vertex schedule is a newly-added schedule or a schedule whose time has been changed, the schedule group includes the start-vertex schedule, too. When the start-vertex schedule is a deleted schedule, the schedule group does not include the start-vertex schedule.

Processing pertaining to steps S4 to S9 is for finding, in a chained manner, schedules which is not joined directly to the start-vertex schedule.

First, a determination is made as to whether or not schedules not yet having undergone overlap checking are present in the schedule group. When unchecked schedules are not found (NO in step S4), processing proceeds to re-allocation of the schedule group. When unchecked schedules still exist (YES in step S4), a schedule A which has not yet undergone overlap checking is acquired from the schedule group (step S5), and a schedule—whose recording time overlaps the recording time of the schedule A and which has not yet been included in the schedule group—is searched through the entire schedule data (step S6). If such schedules exist (YES in step S7), all of the schedules found in step S6 are added to the schedule group (step S8). Next, the schedule A is stored by means of such a method as to set a flag as an overlap-checked schedule (step S9), and processing returns to step S4.

There may also be the case where schedules which overlap each other in terms of a recording time and whose available recording resources are mutually exclusive are searched. This case corresponds to a case where only the schedules whose available recording resources are mutually exclusive are joined to each other as a schedule conflict network.

Figure 12:
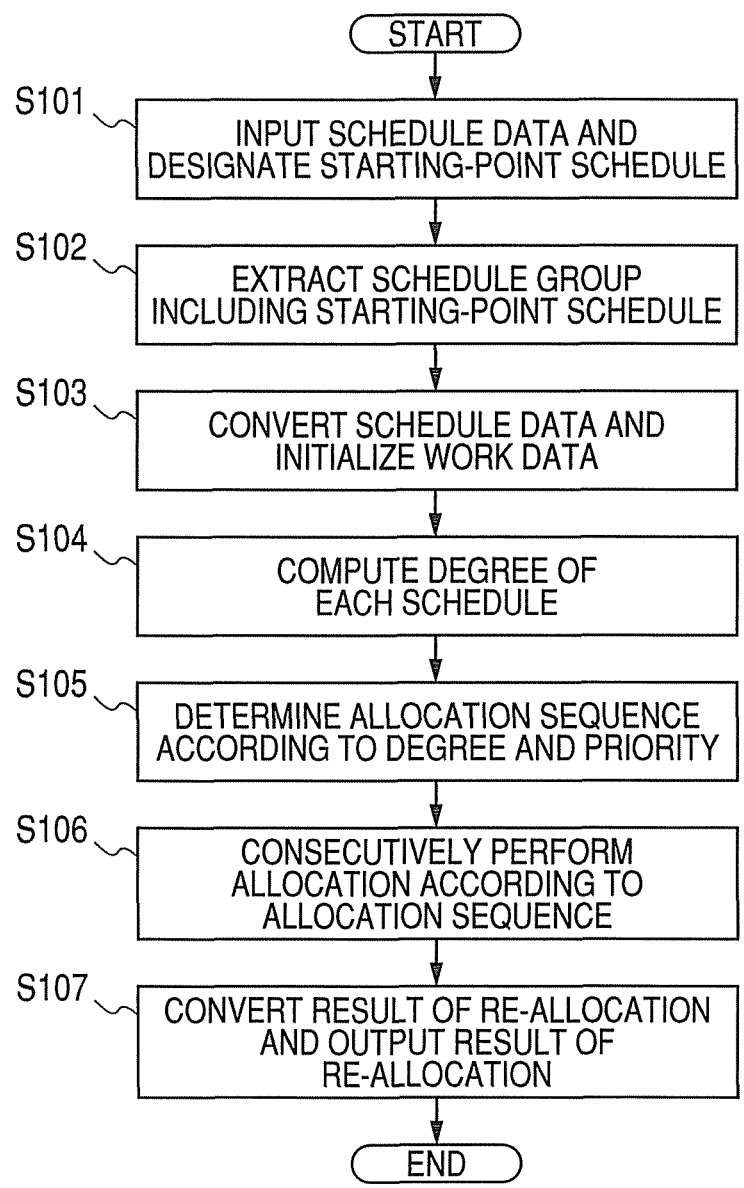
FIG. 12 is a flowchart showing the overview of processing procedures of a recording scheduling device of the recorder according to the embodiment.

Next, overall processing procedures of the resource allocation processing unit 1 will be described by reference to FIGS. 12 and 13. FIG. 12 shows the overview of entire processing procedures of the resource allocation processing unit 1. First, schedule registration data and a start-vertex schedule ID are input from the recording schedule management unit 2 (step S101). The schedule group extraction unit 11 extracts a schedule group including the start-vertex schedule (step S102), and the schedule data conversion unit 16 performs conversion of the schedule data and initialization of work data, as necessary (step S103). The degree calculating unit 12 calculates a degree of each of the schedules (step S104), and the allocation sequence determination unit 13 determines an allocation sequence in accordance with the degree and priority of the schedule (step S105). In the network, the number of edges joined to a certain node is referred to as a "degree" in the graph theory. For instance, in an example shown in FIG. 9, the degree of the schedule of the program B and the degree of the schedule of the program H are two. The consecutive allocation unit 14 consecutively performs allocation in accordance with the allocation sequence (step S106). If necessary, the schedule data conversion unit 16 again converts a result of re-allocation and output a result of conversion to the recording schedule management unit 2 (step S107).

Processing pertaining to steps S105 and S106 will be described in more detail by reference to FIG. 13. Steps S201 to S212 correspond to details about allocation sequence determination processing pertaining to step S105. First, a schedule A—whose degree is less than the number of candidates for available resources and which has not yet been deleted from the network—is searched from the schedule group (step 201). A schedule whose degree is less than the number of candidates for available resources can be allocated a resource without fail even when another schedule joined to the schedule is allocated to any resource. Therefore, the possibility of successful allocation of resources to the overall schedule group becomes higher, so long as the sequence of allocation of lower degree schedule is less prioritized.

When there is no schedule A whose degree is less than the number of candidates for available resources (NO in step S202), processing proceeds to step S207. When such a schedule A is present (YES in S202), a edge is made to the schedule A. A schedule B whose degree has not yet been updated is searched (step S203). When such a schedule B is present (YES in step S204), the degree of the schedule B is reduced by an amount corresponding to the combination of resource patterns of the schedules A and B, and the degree of the schedule B is taken as having been updated (step S205). When such a schedule B is not present (NO in step S204), the schedule A is handled as being deleted from the network; the thus-deleted schedule is stacked (step S206); and processing returns to step S201.

Supplemental descriptions will be provided later in connection with the weight of the combination of the resource patterns in degree computation. The expression "a schedule is handled as being deleted from the network" signifies means for setting a flag so that the schedule is identified as having been deleted from the schedule conflict network, and does not signify elimination of information about a network connection. Further, the stack corresponds to temporary storage unit having a FILO (first-in Last-out) structure. Another means may also be employed, so long as schedule IDs can be fetched in sequence reverse to that along which the IDs have been stored through processing subsequent to step S213 to be descried later.

Next, so long as all of the schedules of the schedule group are handled as being deleted from the network (YES in step S207), processing moves to step S213. If not (NO in step S207), at least one schedule C—which is not handled as being deleted from the network and which has the minimum degree of priority—is searched (step S208). Further, a edge is made to the schedule C, to thus search a schedule D whose degree has not yet been updated (step S209). When such a schedule D is found (YES in step S210), the degree of the schedule D is reduced by an amount corresponding to a weight of the combination of resource patterns of the schedules C and D; the degree of the schedule D is taken as having already been updated; and processing returns to step S209 (step S211). When such a schedule D is not found (NO in step S210), the schedule C is handled as being deleted from the network; the schedule is stacked; and processing returns to step S201 (step S212).

Step S213 to step S215 correspond to details of consecutive allocation processing pertaining to step S106. When the stack is vacant (YES in step S213), all of the allocation processing operations are determined to have been completed. When the stack is not vacant (NO in step S213), one schedule E is fetched from the head of the stack, and the thus-fetched schedule is taken as being restored to the network (step S214). An allocated schedule joined to the schedule E is found from the schedules handled as being restored to the network, and a recording resource which does not conflict with (does not have an exclusive relationship with) a recording resource of that schedule is allocated. When allocation of a recording resource is not possible, an allocation failure flag is set, and processing returns to step S213 (step S215).

When allocation is determined to be impossible through processing pertaining to step S215 because of no available resources, it may also be the case where the resource allocated before re-allocation or a resource desired by the user will be temporarily allocated and where processing for partially recording a program while a portion of the schedule is omitted will be practiced at the time of recording operation being performed by the broadcast data recording unit 3. Further, when schedule information has information about the user's preference as to desirable recording resources, it may also be the case where re-allocation will be performed prioritizing such a preference of the user in processing pertaining to step S215.

Figure 13:
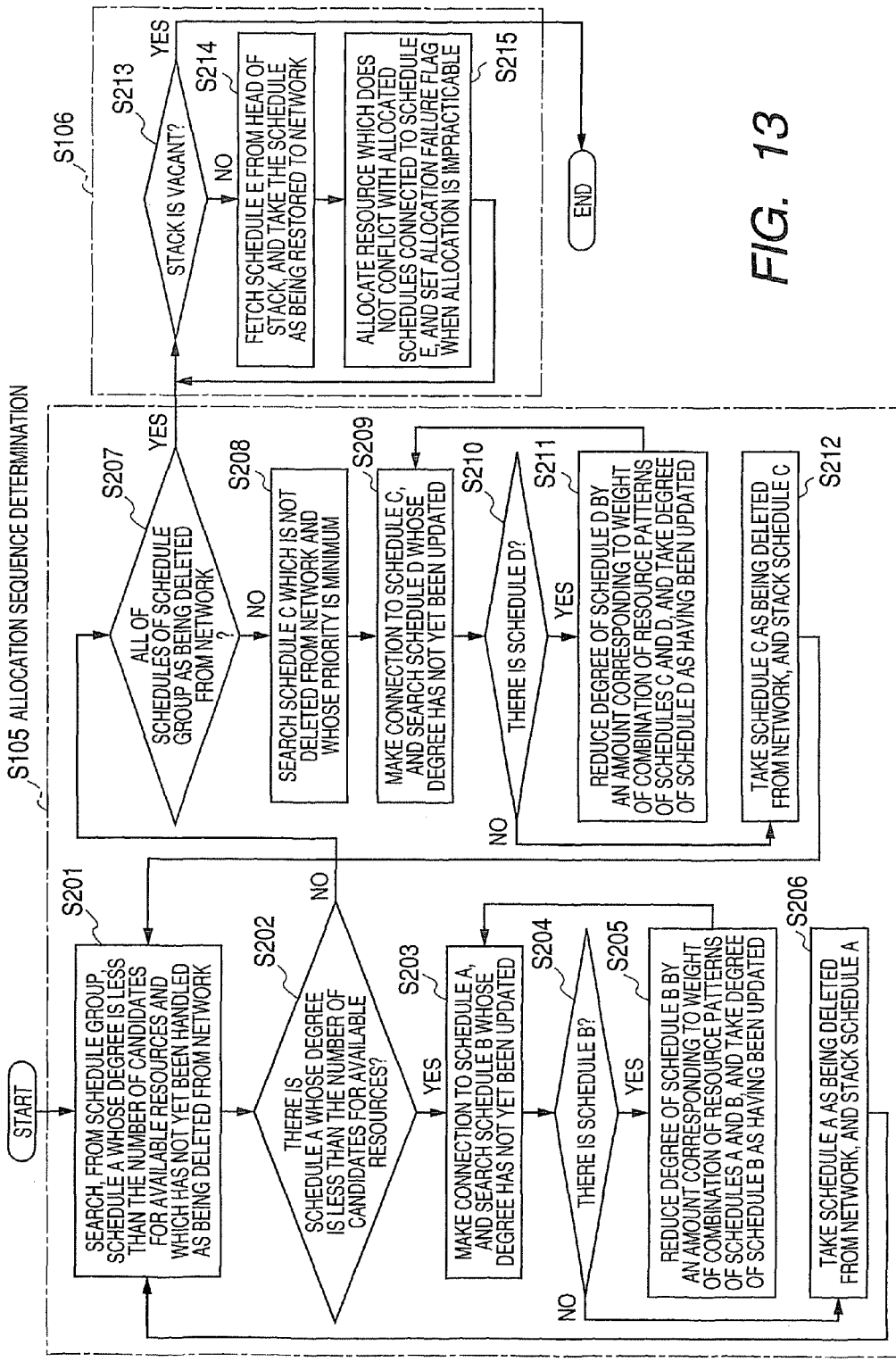
FIG. 13 is a flowchart showing details of an allocation sequence determination step and a consecutive allocation step shown in FIG. 12.
Figure 14:
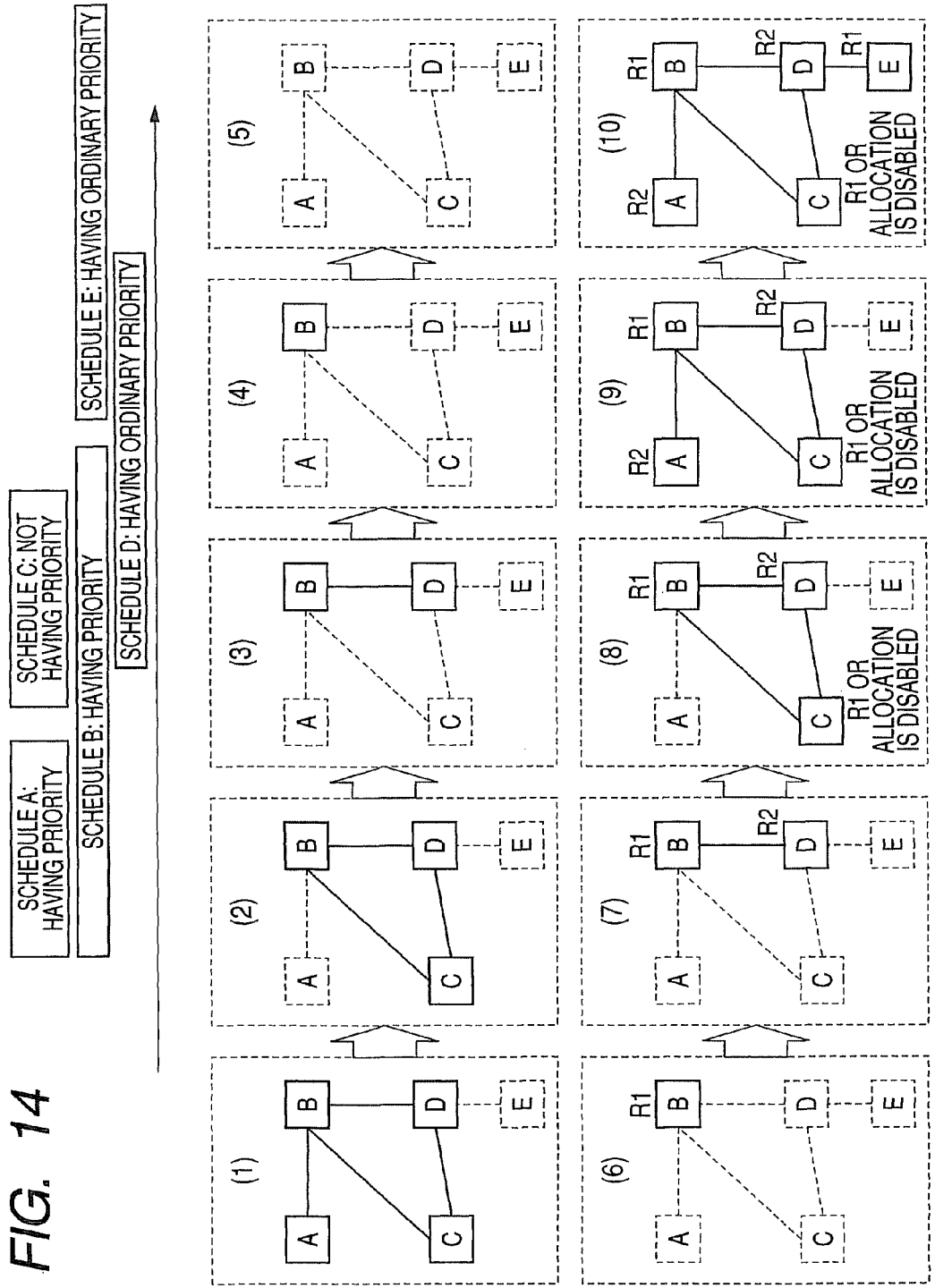
FIG. 14 is a descriptive view showing example allocation of recording resources in the recorder.

FIG. 14 shows an example of processing shown in FIG. 13. In the example, five schedules A, B, C, D, and E are extracted as a schedule group and taken as objects of re-allocation. Schedules A and B are assumed to have the highest priority; the schedules D and E are assumed to have an ordinary degree of priority; and the schedule C is assumed to have a lowest degree of priority. (1) to (5) show allocation sequence determination processing pertaining to step S105, and (6) to (10) show consecutive allocation processing pertaining to step S106. In each of schedule conflict networks, a schedule enclosed by a square of dotted line is deemed to be handled as being deleted from the network.

Finally, the weight of the combination of resource patterns in degree computation will be described by reference to FIGS. 15 and 16. During computation of a degree performed in the present embodiment, mutually-joined schedules do not necessarily assume a edge weight of one. There may be the case where the connection weights are asymmetric. For instance, when the definitions shown in FIGS. 4 through 6 are complied in connection with the example recording resource shown in FIG. 3, weight preset values, such as those shown in FIG. 15, are determined in accordance with a combination of resource patterns. Weight definition data conforming to such combinations of resource patterns are previously stored in the recording resource definition data 17 along with other definition data. Under a method for determining values of resource weights, in relation to a schedule joined to a schedule which is to be an object of degree computation, the maximum number of recording resources which have an exclusive relationship with the schedules to be taken as objects of degree computation are assumed to be selected from an aggregation of recording resources which are selectable for the schedule. The number of recording resources having an exclusive relationship with the recording resources, among the aggregation of the resources selectable for the schedule that is to become an object of degree computation, is taken as a weight for an degree.

Figure 16:
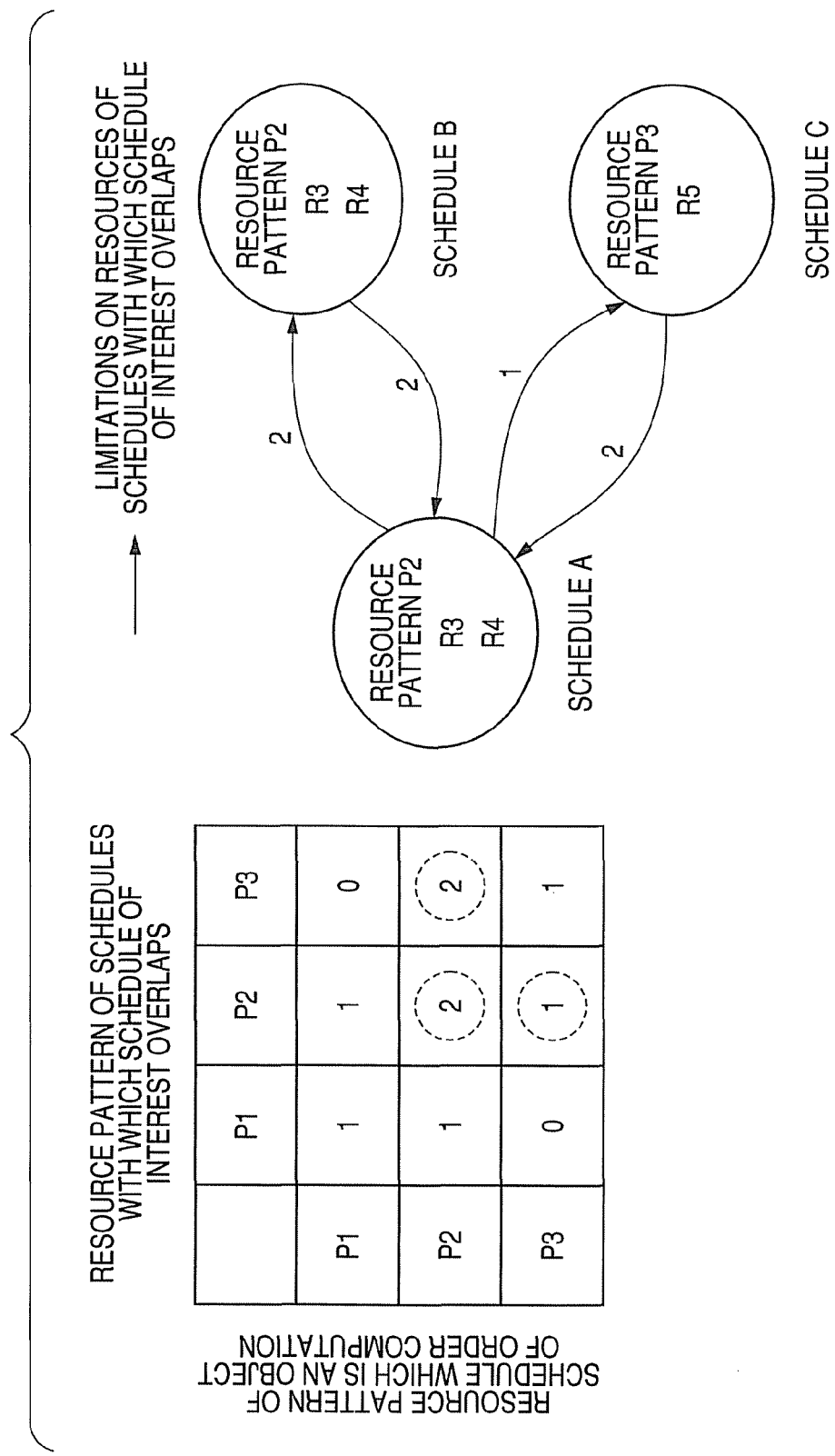
FIG. 16 is a view for describing the order weight table shown in FIG. 15.

For instance, in the case of an example shown in FIG. 16, a schedule A and a schedule B of the resource pattern P2 (which is a digital broadcast and designated as H.264) have a weight of two for the case of updating of a degree. The reason for this is that, when; for example, the resource R2 is used for the schedule A, both resources R3 and R4 of the schedule B cannot be simultaneously used because of the exclusion relationship. In the case of a connection between a schedule for the resource pattern P2 and a schedule for the resource pattern P3 (an analogue broadcast), weights are asymmetric. For instance, when the resource patterns R3 and R4 are used for the schedule A, a resource R5 is not used for the schedule C. However, when the resource R5 is used for the schedule C, both the resource patterns R3 and R4 cannot be used simultaneously for the schedule A because of the exclusive relationship. In this example, the degree of the schedule A is four; the degree of the schedule B is two; and the degree of the schedule C is one.

What is claimed is:

1. A timer-recording managing apparatus for managing timer-recording schedules of two or more broadcast programs using a recorder, the recorder including a plurality of recording resources configured to simultaneously record the broadcast programs, the apparatus comprising:
a processor; and
a memory storing a computer program that, when executed by the processor, causes the apparatus to:
register schedule information including starting times and end times of the broadcast programs in accordance with the respective timer-recording schedules;
change the schedule information, wherein the schedule information includes a resource pattern for specifying an available group of the recording resources to record a broadcast program corresponding to each of the timer-recording schedules, and information as to an availability of re-allocation of the recording resources;
extract timer-recording schedules that are affected by an allocation of the recording resources to a start-vertex timer-recording schedule in response to a change of the schedule information with respect to the start-vertex timer-recording schedule, wherein the start-vertex timer-recording schedule and the timer-recording schedules are connected in a schedule conflict network which is formed by mutually joining the timer-recording schedules overlapping with respect to recording time;
reallocate the recording resources to the extracted timer-recording schedules based on the schedule information and resource exclusiveness data, wherein the resource exclusiveness data defines mutual exclusiveness among the recording resources;
calculate a degree defined as a sum of weights of edges as to the respective timer-recording schedules in the schedule conflict network;
determine a sequence of allocating the recording resources to the timer-recording schedules in accordance with the degree; and
consecutively allocate the recording resources to the timer-recording schedules in accordance with the sequence so as to avoid exclusiveness between currently allocated recording resources and previously allocated recording resources.

2. The apparatus according to claim 1, wherein a schedule conflict network is formed by mutually joining the timer-recording schedules overlapping with respect to recording time and mutually exclusive with respect to an availability of the recording resources.

3. The apparatus according to claim 1, wherein the computer program, when executed by the processor, further causes the apparatus to specify schedule priority among the timer-recording schedules; and
determine the sequence based on the degree and the schedule priority.

4. The apparatus according to claim 1, wherein the computer program, when executed by the processor, further causes the apparatus to calculate the degree with respect to each of the timer-recording schedules in the schedule conflicting network; and
when calculating the degree with respect to a predetermined schedule in the timer-recording schedules, the weights of edges are defined as the number of recording resources that are exclusive with the resource of the other schedule joined with the target schedule, on assumption that the selection of the resource maximize the number of exclusive resources.

5. The apparatus according to claim 1, wherein the schedule information includes information about a recording resource desired by a user; and the computer program, when executed by the processor, further causes the apparatus to:
reallocate the recording resource prioritizing a preference of the user.

6. A non-transitory computer program product embodied on a readable medium, which when executed by a computer, cause a computing system to perform operations that manage timer recording schedules of two or more broadcast programs using a recorder, the recorder including a plurality of recording resources configured to simultaneously record the broadcast programs, the operations comprising:
registering schedule information including starting times and end times of the broadcast programs in accordance with respective timer recording schedules;
changing the schedule information wherein the schedule information includes a resource pattern for specifying an available group of the recording resources to record a broadcast program corresponding to each of the timer-recording schedules, and information as to an availability of re-allocation of the recording resources;
extracting timer-recording schedules that are affected by an allocation of the recording resources to a start-vertex timer-recording schedule in response to a change of the schedule information with respect to the start-vertex timer-recording schedule, wherein the start-vertex timer-recording schedule and the timer-recording schedules are connected in a schedule conflict network which is formed by mutually joining the timer-recording schedules overlapping with respect to recording time;
reallocating the recording resources to the extracted timer-recording schedules based on the schedule information and resource exclusiveness data, wherein the resource exclusiveness data defines mutual exclusiveness among the recording resources;
calculating a degree defined as a sum of weights of edges as to the respective timer-recording schedules in the schedule conflict network;
determining a sequence of allocating the recording resources to the timer-recording schedules in accordance with the degree; and
consecutively allocating the recording resources to the timer-recording schedules in accordance with the sequence so as to avoid exclusiveness between currently allocated recording resources and previously allocated recording resources.

7. A recorder comprising:
a plurality of recording resources configured to simultaneously record the broadcast programs;
a timer-recording managing apparatus for managing timer-recording schedules of two or more broadcast programs using the recorder, the apparatus comprising:
a processor; and
a memory storing a computer program that, when executed by the processor, causes the apparatus to:
register schedule information including starting times and end times of the broadcast programs in accordance with the respective timer-recording schedules;
change the schedule information, wherein the schedule information includes a resource pattern for specifying an available group of the recording resources to record a broadcast program corresponding to each of the timer-recording schedules, and information as to an availability of re-allocation of the recording resources;
extract timer-recording schedules that are affected by an allocation of the recording resources to a start-vertex timer-recording schedule in response to a change of the schedule information with respect to the start-vertex timer-recording schedule, wherein the start-vertex timer-recording schedule and the timer-recording schedules are connected in a schedule conflict network which is formed by mutually joining the timer-recording schedules overlapping with respect to recording time;

reallocate the recording resources to the extracted timer-recording schedules based on the schedule information and resource exclusiveness data, wherein the resource exclusiveness data defines mutual exclusiveness among the recording resources;

calculating a degree defined as a sum of weights of edges as to the respective timer-recording schedules in the schedule conflict network;

determining a sequence of allocating the recording resources to the timer-recording schedules in accordance with the degree; and consecutively allocating the recording resources to the timer-recording schedules in accordance with the sequence so as to avoid exclusiveness between currently allocated recording resources and previously allocated recording resources.

* * * * *